(12) United States Patent  
Maeda (10) Patent No.: US 7,403,246 B2  
(45) Date of Patent: Jul. 22, 2008

(54) LIQUID CRYSTAL DISPLAY DEVICE AND ELECTRONIC APPARATUS

(75) Inventor: Tsuyoshi Maeda, Ryuo-cho (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/638,398

(22) Filed: Dec. 14, 2006

(65) Prior Publication Data

US 2007/0091234 A1   Apr. 26, 2007

Related U.S. Application Data

(62) Division of application No. 10/846,541, filed on May 17, 2004, now Pat. No. 7,256,846.

(30) Foreign Application Priority Data

Jun. 6, 2003   (JP)   ............... 2003-162356

(51) Int. Cl.  
  *G02F 1/1335* (2006.01)  
  *G02F 1/1337* (2006.01)  
(52) U.S. Cl. ...................... 349/114; 349/129  
(58) Field of Classification Search ........... 349/114, 349/130  
  See application file for complete search history.

(56) References Cited

U.S. PATENT DOCUMENTS

| | | | |
|---|---|---|---|
| 6,661,488 B1 | 12/2003 | Takeda et al. | |
| 6,724,452 B1 | 4/2004 | Takeda et al. | |
| 6,753,939 B2 | 6/2004 | Jisaki et al. | |
| 6,788,375 B2 | 9/2004 | Ogishima et al. | |
| 6,864,945 B2 | 3/2005 | Fujimori et al. | |
| 6,922,219 B2 * | 7/2005 | Jin et al. ................ | 349/113 |
| 6,924,876 B2 | 8/2005 | Kubo et al. | |

(Continued)

FOREIGN PATENT DOCUMENTS

JP   A 11-242226   9/1999

(Continued)

OTHER PUBLICATIONS

Jisaki et al. "Development of transflective LCD for high contrast and wide viewing angle by using homeotropic alignment", Asia Display/IDW '01, pp. 133-136. 2001.

*Primary Examiner*—James A Dudek  
(74) *Attorney, Agent, or Firm*—Oliff & Berridge, PLC (57) ABSTRACT

The invention can provide a liquid crystal display device in which a homeotropic alignment liquid crystal layer is interposed between a pair of substrates and a transmissive display region and a reflective display region are provided in one dotregion. A liquid crystal layer thickness-adjusting layer for making the thickness of the liquid crystal layer in the reflective display region smaller than the thickness of the liquid crystal layer in the transmissive display region can be formed between at least one substrate of the pair of substrates and the liquid crystal layer, and wherein, in at least one substrate of the pair of substrates, convex portions that protrude from the internal surface of the substrate to the inside of the liquid crystal layer are formed in the transmissive display region in the dot region and in the region where the liquid crystal layer thickness-adjusting layer is formed outside the dot region. Accordingly, the invention can provide a liquid crystal display device capable of displaying images with a wide angle in both of transmissive display and reflective display.

8 Claims, 9 Drawing Sheets

U.S. PATENT DOCUMENTS

| | | |
|---|---|---|
| 2002/0149728 A1 | 10/2002 | Ogishimia et al. |
| 2004/0119924 A1 | 6/2004 | Takeda et al. |
| 2004/0141117 A1 | 7/2004 | Tashiro et al. |
| 2004/0160556 A1* | 8/2004 | Tsuchiya et al. ............ 349/114 |
| 2004/0165129 A1 | 8/2004 | Okumura |
| 2004/0227876 A1 | 11/2004 | Okumura |

FOREIGN PATENT DOCUMENTS

| | | |
|---|---|---|
| JP | A-2000-75302 | 3/2000 |
| JP | A 2001-83523 | 3/2001 |
| JP | 2002-072220 | 3/2002 |
| JP | A 2002-350853 | 12/2002 |
| JP | 2003-167253 | 6/2003 |
| KR | 2002-79583 | 10/2002 |

* cited by examiner

LIQUID CRYSTAL DISPLAY DEVICE AND ELECTRONIC APPARATUS

This is a Division of application Ser. No. 10/846,541 filed May 17, 2004. The disclosure of the prior application is hereby incorporated by reference herein in its entirety.

BACKGROUND OF THE INVENTION

1. Field of Invention

The invention relates to a liquid crystal display device and an electronic apparatus. More specifically, the invention is related to technology for obtaining a wide viewing angle in a liquid crystal display device using a homeotropic alignment liquid crystal.

2. Description of Related Art

Transflective liquid crystal display devices which include a reflective mode and a transmissive mode are known. In a transflective liquid crystal display device, a liquid crystal layer is interposed between an upper substrate and a lower substrate. A reflecting film with a light transmissive window in a metal film such as aluminum is provided on the internal surface of the lower substrate. The reflecting film functions as a transflective sheet. In this case, in the reflective mode, external light incident from the upper substrate is reflected from the reflecting film on the internal surface of the lower substrate after passing through the liquid crystal layer, then passes through the liquid crystal layer again and is emitted from the upper substrate to contribute to display. On the other hand, in the transmissive mode, the light from a backlight incident from the lower substrate passes through the liquid crystal layer through the window of the reflecting film and is emitted from the upper substrate to the outside to contribute to the display. Therefore, the region of the reflecting film with the window is the transmissive display region and the other region is the reflective display region.

In conventional transflective liquid crystal devices, the viewing angle in transmissive display is narrow. This is because, since a transflective sheet is provided on the internal surface of a liquid crystal cell so that parallax is not generated, only one polarizer provided on an observer side works on the reflective display and the degree of freedom of optical design is small. Therefore, in order to solve this problem, Jisaki et al. suggested a new liquid crystal display device using a homeotropic alignment liquid crystal in "Development of transflective LCD for high contrast and wide viewing angle by using homeotropic alignment", M. Jisaki et al., Asia Display/IDW'01, P. 133-136 (2001) cited below. The liquid crystal display device has the following three characteristics:

(1) A vertical alignment (VA) mode, in which liquid crystal molecules with negative dielectric anisotropy are vertically aligned on a substrate and the liquid crystals fall by applying a voltage.

(2) A "multi-gap structure" is adopted, in which the thickness (a cell gap) of the liquid crystal layer in the transmissive display region is different from that of the liquid crystal layer in the reflective display region (with respect to this point, refer to Japanese Unexamined Patent Application Publication No. 11-242226).

(3) The transmissive display region is an octagon and protrusions are provided in the middle of the transmissive display region on a counter substrate so that the liquid crystal molecules fall in eight directions in the region.

See also, generally, Japanese Unexamined Patent Application Publication No. 2002-350853.

SUMMARY OF THE INVENTION

It is very effective to include the multi-tap structure like the one described above in the transflective liquid crystal display device when the electro-optical characteristics (transmittance-voltage characteristics and reflectance-voltage characteristics) of the transmissive display region are adjusted to those of the reflective display region. This is because light passes through the liquid crystal layer only once in the transmissive display region but twice in the reflective display region.

When the multi-gap structure is adopted and the directions in which the liquid crystal molecules fall are controlled by using the protrusions mentioned above, for example, when spacers for regulating the thickness of the liquid crystal layer are provided, the spacers float in the transmissive display region where the thickness of the liquid crystal layer is large or the thickness of the liquid crystal layer must be designed in consideration of the height of the protrusions and the size of the spacers, which makes the structure complicated. That is, in the multi-gap structure liquid crystal display device which uses protrusions for regulating the directions in which the liquid crystal molecules fall, effort is required to design the thickness of the liquid crystal layer and since the thickness of the liquid crystal layer strongly affects the display characteristics, errors generated in the design of the thickness of the liquid crystal layer may cause an inferior display.

It is an object of the invention to provide a homeotropic alignment transflective liquid crystal display device capable of displaying images with a wide viewing angle and having a structure more suitable for regulating the thickness (the distance between substrates, that is, a cell gap) of a liquid crystal layer. It is another object of the invention to provide a reliable liquid crystal display device whose structure is simplified, thus improving the manufacturing efficiency and reducing the occurrence of inferior quality. It is still another object of the present invention to provide a reliable electronic apparatus comprising the above-mentioned liquid crystal display device.

The invention can provide a liquid crystal display device in which a liquid crystal layer is interposed between a pair of substrates and a transmissive display region and a reflective display region are provided in one dot region. The liquid crystal layer can be made of liquid crystal with negative dielectric anisotropy that is vertically aligned in an initial state. A liquid crystal layer thickness-adjusting layer for making the thickness of the liquid crystal layer in the reflective display region smaller than the thickness of the liquid crystal layer in the transmissive display region is formed between at least one substrate of the pair of substrates and the liquid crystal layer, and wherein, in at least one substrate of the pair of substrates, convex portions that protrude from the internal surface of the substrate to the inside of the liquid crystal layer are formed in the transmissive display region in the dot region and in the region where the liquid crystal layer thickness-adjusting layer is formed outside the dot region.

The liquid crystal display device according to the invention can be obtained by combining liquid crystal in a vertical alignment mode with a transflective liquid crystal display device and by adding a liquid crystal layer thickness-adjusting layer (that is, a multi-gap structure) to the transflective liquid crystal display device for making birefringence retardation of a reflective display region almost equal to that of a transmissive display region and it has structures for preferably controlling the directions of the alignment of liquid crystal molecules and preferably regulating the thickness of the liquid crystal layer in place of spacers.

In other words, according to the liquid crystal display device in the vertical alignment mode, liquid crystal molecules that are vertically erect with respect to the substrate in an initial state fall by applying an electric field. When nothing is designed (when pre-tilt is not given), the directions in which the liquid crystal molecules fall cannot be controlled and disorder (disclinations) in the alignment is caused which generates display problems such as light leakage and deteriorates display quality. Therefore, when a vertical alignment mode is employed, control of the directions in which the liquid crystal molecules are aligned when the electric field is applied is an important factor.

Therefore, in the liquid crystal display device according to the invention, a convex portion is formed in at least the transmissive display region of a dot region. The directions in which the liquid crystal molecules are aligned in the region are regulated.

According to such alignment regulation, the liquid crystal molecules are vertically aligned in an initial state and have pre-tilt according to the shape of the convex portion. As a result, it is possible to regulate or control the directions in which the liquid crystal molecules fall in the dot region. Therefore, it is difficult to cause the disorder (disclinations) in the alignment and it is possible to avoid the inferiority in the display such as light leakage. As a result, it is possible to reduce problems, such as after images and spots, and provide a liquid crystal display device with a wide viewing angle. Also, according to the invention, the convex portion is provided in the transmissive display region in the dot region. This is because the luminosity of the transmissive display is higher than that of the reflective display. The convex portion may be formed in each of the reflective display region and the transmissive display regions.

According to the invention, the convex portion can be formed not only in the transmissive display region in order to regulate the alignment of the liquid crystal molecules, but also outside the dot region. Accordingly, it is possible to regulate the directions in which the liquid crystal molecules fall outside the dot region. Therefore, it is possible to prevent alignment inferiority in the liquid crystal molecules in the dot region due to the inferiority in the alignment, which is generated outside the dot region. Furthermore, since the convex portion outside the dot region is formed in the region where a liquid crystal layer thickness-adjusting layer is arranged, it is possible to use the convex portion outside the dot region as a means for adjusting the thickness (the distance between the substrates (hereinafter, it is referred to as the cell gap)) of the liquid crystal layer. That is, since the thickness of the liquid crystal layer is small in the region where the liquid crystal layer thickness-adjusting layer is formed, it is possible to use the convex portion as a liquid crystal layer thickness-regulating device for maintaining the cell gap at a predetermined thickness. As mentioned above, the liquid crystal display device according to the invention includes a structure for regulating the directions in which the liquid crystal molecules fall. At the same time, at least one of the devices for regulating the directions in which the liquid crystal molecules fall includes a function of regulating the cell gap. Therefore, it is not necessary to provide additional spacers as is conventionally done. As a result, it is possible to prevent the spacers from floating in the transmissive display region where the thickness of the liquid crystal layer is relatively large. Also, according to the invention, for example, the internal surface side of the substrate means the liquid crystal layer side of the substrate. That the convex portion protrudes above the substrate means that the convex portion protrudes from the internal surface of the liquid crystal layer thickness-adjusting layer when the liquid crystal layer thickness-adjusting layer can be formed on the internal surface of the substrate.

Also, there can be provided a liquid crystal display device in which a liquid crystal layer that is interposed between a pair of substrates and a transmissive display region and a reflective display region are provided in one dot region, wherein the liquid crystal layer is made of liquid crystal with negative dielectric anisotropy that is vertically aligned in an initial state, wherein a liquid crystal layer thickness-adjusting layer for making the thickness of the liquid crystal layer in the reflective display region smaller than the thickness of the liquid crystal layer in the transmissive display region is formed between at least one substrate of the pair of substrates and the liquid crystal layer, and wherein, in at least one substrate of the pair of substrates, convex portions that protrude from the internal surface of the substrate to the inside of the liquid crystal layer are formed in the transmissive display region and the reflective display region in the dot region. In accordance with such a liquid crystal display device, the directions in which the liquid crystal molecules fall are preferably regulated by the convex portion like in the above-mentioned structure. Furthermore, the convex portion formed in the reflective display region where the thickness of the liquid crystal layer is small can be used as the means for regulating the cell gap.

In the liquid crystal display device according to the invention, each of the heights of the convex portions is almost equal to the thickness of the liquid crystal layer in the reflective display region. According to the invention, the thickness of the liquid crystal layer of the reflective display region is small since the multi-gap structure is employed. Therefore, it is possible to use the convex portion as the means for regulating the cell gap by forming the convex portion to have the height almost equal to the thickness of the liquid crystal layer of the reflective display region. Also, the convex portions have surfaces inclined at a predetermined angle with respect to the surfaces of the substrate for interposing the liquid crystal layer therebetween. It is possible to regulate the directions in which the liquid crystal molecules fall along the tilted surface by including the tilted surfaces.

Also, in the liquid crystal display device according to the invention, electrodes for driving the liquid crystal are provided on the liquid crystal layer sides of the pair of substrates, and the convex portions are formed on at least one electrode of the electrodes facing the liquid crystal layer. In this case, an alignment film for vertically aligning the liquid crystal is formed on the convex portions and the internal surface side of the liquid crystal layer of the electrode. Also, circular polarizers for making circularly polarized light incident on the liquid crystal layer are provided on the sides of the pair of substrates opposite to the liquids' crystal layer, respectively. The circular polarizer may be obtained by composing a polarization layer with a retardation layer.

Furthermore, in the liquid crystal display device according to the invention, an upper substrate and a lower substrate are provided as the pair of substrates, a backlight for transmissive display is provided on the side of the lower substrate opposite to the liquid crystal layer, and a reflective layer selectively formed in the reflective display region is formed on the side of the lower substrate facing the liquid crystal layer. In this case, it is possible to use the light from the backlight, which is incident from the lower substrate, for the transmissive display and to reflect external light such as illumination and solar light incident from the upper substrate in the reflective layer to thus be used for the reflective display.

Also, the convex portion formed in the transmissive display region and the convex portion formed outside the dot region or the convex portion formed in the reflective display region are preferably formed in the same process in order to improve the manufacturing efficiency. In this case, the respective convex portions are made of the same material to thus easily make the respective convex portions have almost equal height.

An electronic apparatus according to the invention can include the above-mentioned liquid crystal display device. Such an electronic apparatus can operate in the transmissive mode and the reflective mode. Therefore, it is possible to provide an electronic apparatus having a display in which images can be displayed with a wide viewing angle in both of the display modes.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

The preferred embodiments of the invention will now be further described with reference to the drawings. In the drawings, it should be understood that the thickness of individual layers and regions are exaggerated for clarity.

A liquid crystal display device according to an embodiment of the invention is an active matrix liquid crystal display device using a thin film diode (TFD) as a switching element, in particular, a transflective liquid crystal display device capable of performing reflective and transmissive display.

Figure 1:
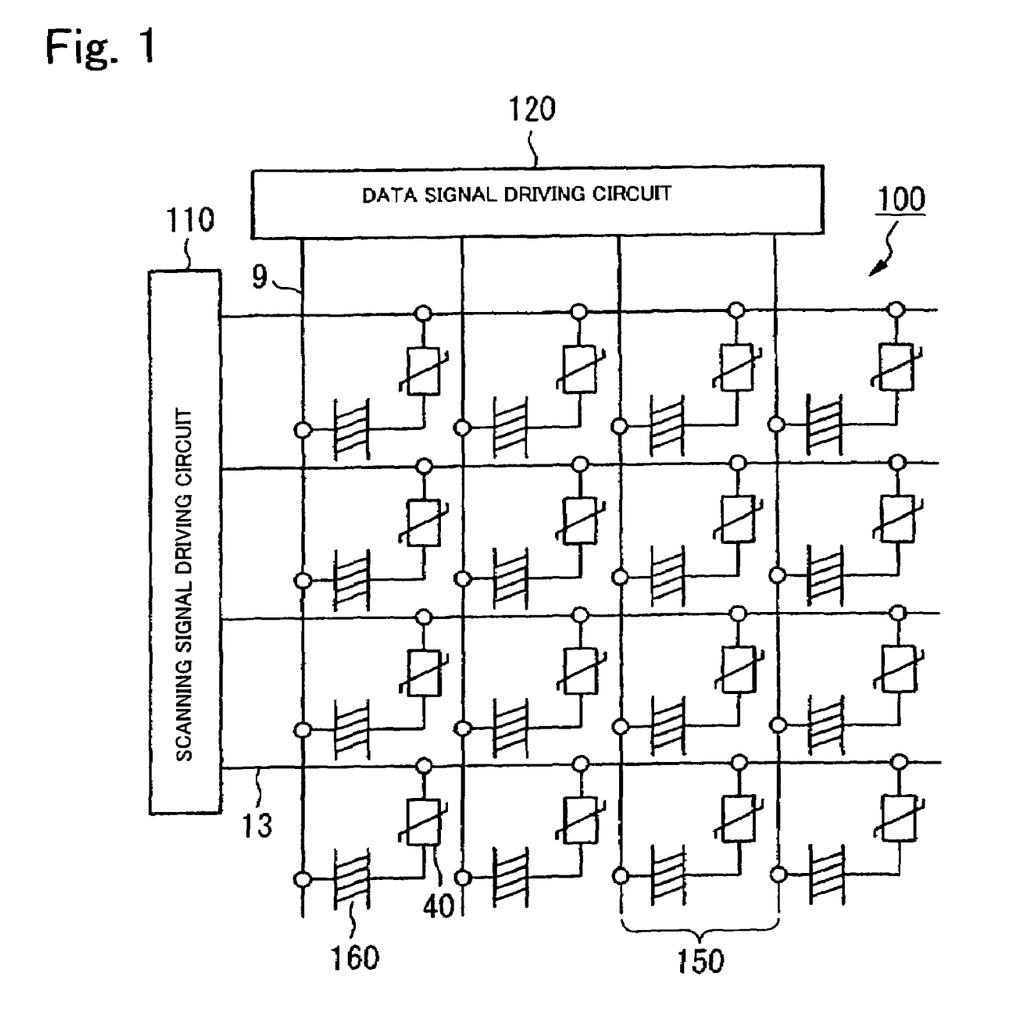
FIG. 1 is an equivalent circuit diagram of a liquid crystal display device according to a first embodiment.

FIG. 1 is an equivalent circuit diagram of a liquid crystal display device 100 according to the embodiment. The liquid crystal display device 100 can include a scanning signal driving circuit 110 and a data signal driving circuit 120. Signal lines, that is, a plurality of scanning lines 13 and a plurality of data lines 9 that cross the scanning lines 13 are provided in the liquid crystal display device 100. The scanning lines 13 are driven by the scanning signal driving circuit 110. The data lines 9 are driven by the data signal driving circuit 120. In the respective pixel regions 150, TFD elements 40 are serially connected to liquid crystal display components (liquid crystal layers) 160 between the scanning lines 13 and the data lines 9. On the other hand, in FIG. 1, the TFD elements 40 are connected to the scanning lines 13 and the liquid crystal display elements 160 are connected to the data lines 9. However, on the contrary, the TFD elements 40 may be connected to the data lines 9 and the liquid crystal display components 160 may be connected to the scanning lines 13.

Figure 2:
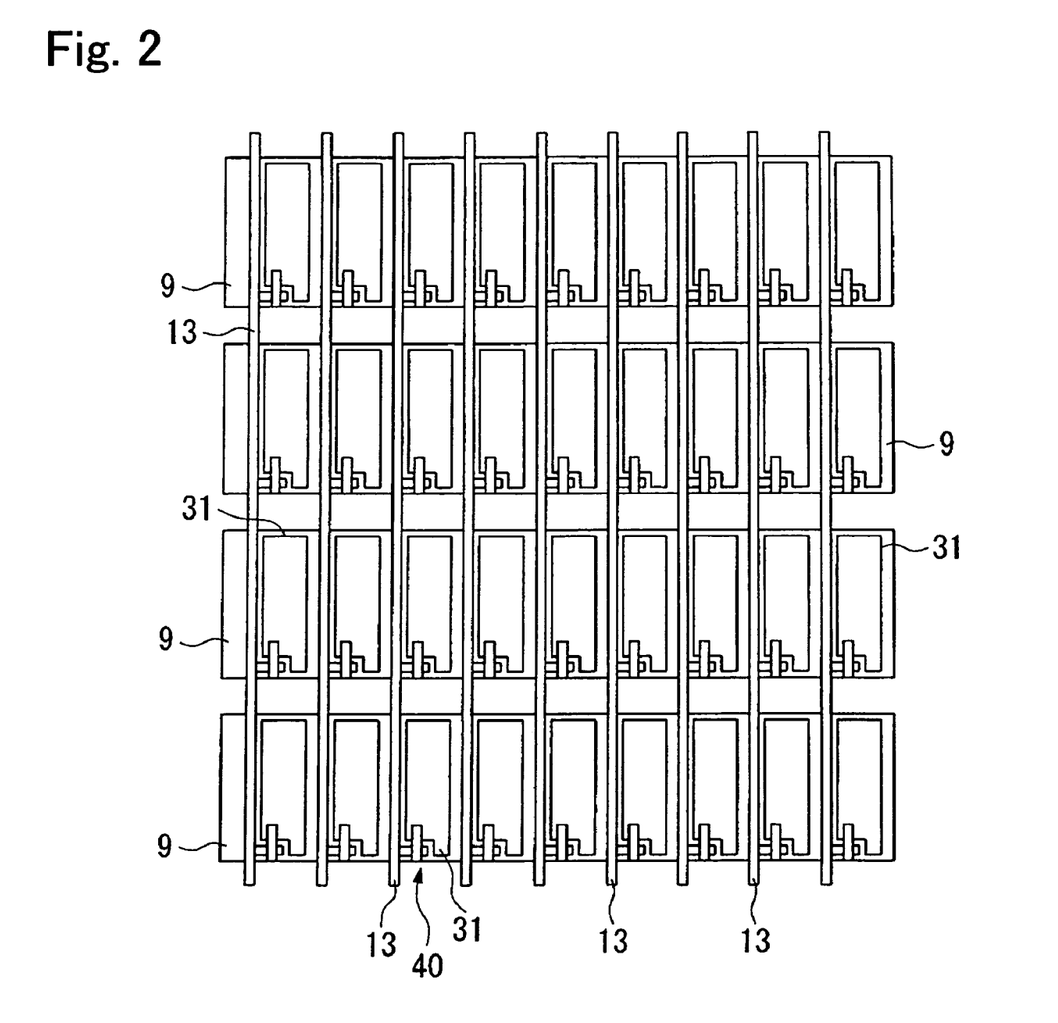
FIG. 2 is a plan view illustrating the structure of the electrodes of the liquid crystal display device of FIG. 1.

Hereinafter, with reference to FIG. 2, the planar structure of the electrodes included in the liquid crystal display device according to the embodiment will now be described. As illustrated in FIG. 2, in the liquid crystal display device according to the embodiment, pixel electrodes 31 which is rectangular in plan view are connected to the scanning lines 13 via the TFD elements 40 are provided in a matrix and the rectangular common electrodes 9 (in a stripe) are provided to face the pixel electrodes 31 in a direction vertical to the plane of the drawing. The common electrodes 9 are composed of the data lines and cross the scanning lines 13 in strips. According to the embodiment, each region in which each of the pixel electrodes 31 is formed constitutes one dot region, and images can be displayed in each of the dot regions arranged in a matrix.

Here, the TFD elements 40 are switching elements for connecting the scanning lines 13 to the pixel electrodes 31. The TFD elements 40 have an MIM structure in which a first conductive film using Ta as a main component, an insulating film formed on the surface of the first conductive film and using $Ta_2O_3$ as a main component, and a second conductive film formed on the surface of the insulating film and using Cr as a main component are provided. The first conductive films of the TFD elements 40 are connected to the scanning lines 13 so that the second conductive films are connected to the pixel electrodes 31.

Figure 3A:
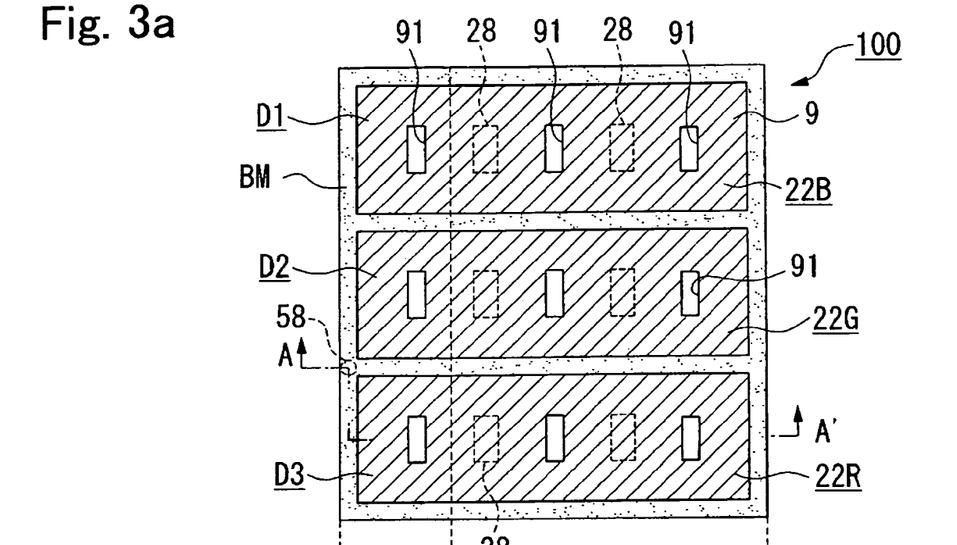
FIG. 3 is a plan schematic view and a sectional schematic view illustrating the enlarged main portion of the liquid crystal display device of FIG. 1.
Figure 3B:
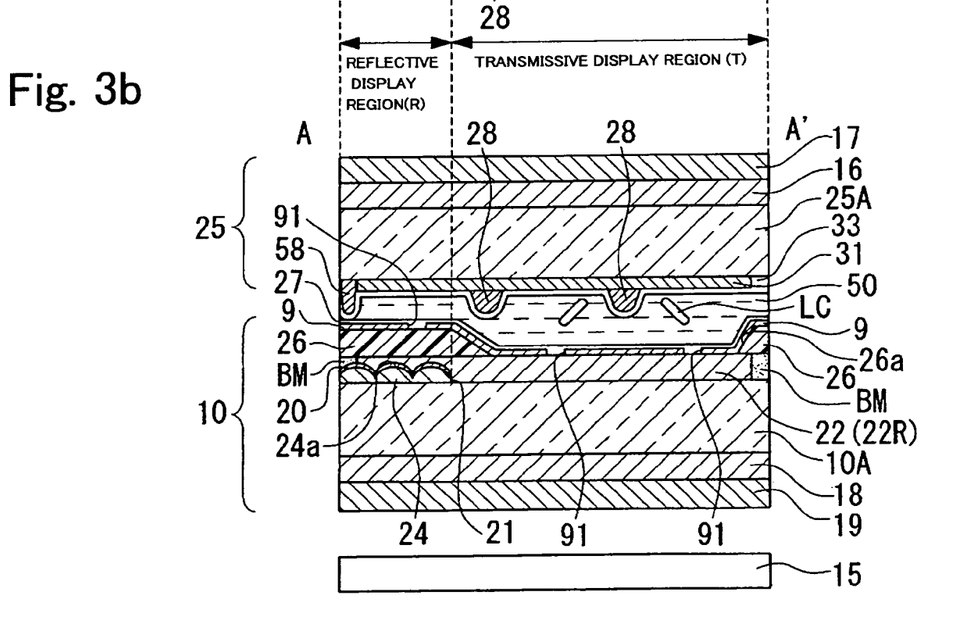

Next, the pixel structure of the liquid crystal display device 100 according to the embodiment will now be described with reference to FIG. 3. FIG. 3(a) is a schematic view illustrating the pixel structure of the liquid crystal display device 100, in particular, the planar structure of the pixel electrode 31. FIG. 3(b) is a schematic view taken along the line A-A' of FIG. 3(a). As illustrated in FIG. 2, the liquid crystal display device 100 according to the embodiment has the dot regions including the pixel electrodes 31 in the regions surrounded by the data lines 9 and the scanning lines 13. In the dot regions, as illustrated in FIG. 3(a), a colored layer of one of three primary colors is arranged corresponding to one dot region. The three dot regions D1, D2, and D3 form a pixel including colored layers 22B (blue), 22G (green), and 22R (red).

On the other hand, as illustrated in FIG. 3(b), in the liquid crystal display device 100 according to the embodiment, liquid crystal whose molecules are vertically aligned in an initial state, that is, a liquid crystal layer 50 made of a liquid crystal material whose dielectric anisotropy is negative, is interposed between an upper substrate (an element substrate) 25 and a lower substrate (a counter substrate) 10 arranged to face the upper substrate.

The lower substrate 10 has a structure in which a reflecting film 20 made of a metal film having a high reflectance, such as aluminum or silver, is partially formed on the surface of a substrate main body 10A made of a light transmissive material such as quartz or glass, with an insulating film 24 therebetween. Here, the region in which the reflecting film 20 is formed constitutes a reflective display region R. The region in which the reflecting film 20 is not formed, that is, the region inside an aperture 21 of the reflecting film 20, is a transmissive display region T. As mentioned above, the liquid crystal display device according to the embodiment can be a vertical alignment liquid crystal display device including the vertical alignment liquid crystal layer 50 and is a transflective liquid crystal display device capable of displaying images in a reflective mode and in a transmissive mode.

The insulating film 24 formed on the substrate main body 10A has a concavo-convex portion 24a on the surface thereof. The surface of the reflecting film 20 also has a concavo-convex portion due to the concavo-convex portion 24a.

Since reflected light is scattered due to such a concavo-convex portion, it is possible to prevent the reflected light from being incident from the outside and to thus display images with a wide viewing angle.

Also, the color filter 22 (the red colored layer 22R in FIG. 3(b)) extending over the reflective display region R and the transmissive display region T is provided on the reflecting film 20 in the reflective display region R and on the substrate main body 10A positioned in the transmissive display region T. Here, the edge of the colored layer 22R is surrounded by a black matrix BM composed of chromium or the like. The boundaries of the respective dot regions D1, D2, and D3 are formed by the black matrix BM (refer to FIG. 3(a)).

Furthermore, an insulating film 26 can be formed on the color filter 22 so as to correspond to the reflective display region R. That is, the insulating film 26 is selectively formed above the reflecting film 20, with the color filter 22 therebetween. The thickness of the liquid crystal layer 50 in the reflective display region R is different from the thickness of the liquid crystal layer 50 in the transmissive display region T due to the formation of the insulating film 26. The insulating film 26 is made of an organic film, such as an acryl resin of a thickness of 0.5 to 2.5 μm, and has a tilted surface so that the thickness thereof can continuously change around the boundary between the reflective display region R and the transmissive display region T. The thickness of the liquid crystal layer 50 in a portion where the insulating film 26 does not exist is about 1 to 5 μm. The thickness of the liquid crystal layer 50 in the reflective display region R is about half of the thickness of the liquid crystal layer 50 in the transmissive display region T.

As mentioned above, the insulating film 26 functions as a liquid crystal layer thickness-adjusting layer (a liquid crystal layer thickness-controlling layer) that makes the thickness of the liquid crystal layer 50 in the reflective display region R different from the thickness of the liquid crystal layer 50 in the transmissive display region T. According to the embodiment, since the edge of the flat surface on the insulating film 26 almost coincides with the edge of the reflecting film 20 (the reflective display region), a part or all of the tilted region of the insulating film 26 is included in the transmissive display region T.

A common electrode 9 made of indium tin oxide ITO) is formed on the surface of the lower substrate 10 including the surface of the insulating film 26. An alignment film 27 made of polyimide is formed on the common electrode 9. The alignment film 27 functions as a vertical alignment film for aligning the liquid crystal molecules in a vertical direction with respect to the surface thereof. An alignment process such as rubbing is not performed. On the other hand, in FIG. 3, the common electrode 9 is in strips so as to extend in a vertical direction with respect to the plane of the drawing and is composed of common electrodes in the respective dot regions formed in parallel in a vertical direction with respect to the plane of the drawing. Also, in the common electrode 9, slits 91 obtained by partially cutting the common electrode are formed. Furthermore, according to the present embodiment, the reflecting film 20 and the common electrode 9 are separately provided and stacked. However, in the reflective display region R, a reflecting film made of a metal film may be used as a part of the common electrode.

Next, in the upper substrate 25, the pixel electrode 31 in a matrix, which is made of a transparent conductive film such as ITO, and an alignment film 33, which is made of polyimide and on which the vertical alignment process is performed like on the lower substrate 10, are formed on a substrate main body 25A made of a light transmissive material, such as glass or quartz (on the liquid crystal layer side of the substrate main body 25A). Protrusions 28 that protrude from the internal surface of the pixel electrode 31 to the inside of the liquid crystal layer 50 are formed on the internal surface side of the upper substrate 25 in the dot region. Also, a protrusion 58 that protrudes from the internal surface of the substrate to the inside of the liquid crystal layer 50 is provided outside the dot region.

A retardation plate 18 and a polarizer 19 are formed on the external surface side (the side opposite to the surface on which the liquid crystal layer 50 is provided) of the lower substrate 10. A retardation plate 16 and a polarizer 17 are formed on the external surface side of the upper substrate 25. Circular polarized light can be incident on the internal surface side of the substrate (the liquid crystal layer 50 side). The retardation plate 18 and the polarizer 19, and the retardation plate 16 and the polarizer 17 constitute circular polarizers, respectively. The polarizer 17(19) transmits only linearly polarized light having a polarization axis in a predetermined direction. A λ/4 retardation plate can be used as the retardation plate 16(18). A backlight 15 that is a light source for the transmissive display is provided outside the polarizer 19 formed on the lower substrate 10.

In the liquid crystal display device 100 according to the embodiment, in order to regulate the alignment of the liquid crystal molecules of the liquid crystal layer 50, that is, as means for regulating the directions in which the liquid crystal molecules that are vertically aligned in an initial state fall when a voltage is applied between electrodes, protrusions made of a dielectric material are formed on the internal surface side (the liquid crystal layer side) of the electrodes. In FIG. 3, in the inside of the transmissive display region T, the protrusions 28 are formed on the internal surface side (the liquid crystal layer side) of the pixel electrode 31 formed in the upper substrate 25.

The protrusions 28 protrude from the internal surface of the substrate (the main surface of the electrode) to the inside of the liquid crystal layer 50 and are in the shape of lines (in strips) in plan view. To be specific, the height of the protrusions 28 is about 0.5 to 2.5 μm, that is, almost equal to the thickness of the liquid crystal layer in the region where the insulating film 26 is not formed (that is, the reflective display region R). Also, the protrusions 28 include a surface (including a slowly curved shape) tilted at a predetermined angle with respect to the internal surface of the substrate (the main surface of the electrode).

Furthermore, the protrusion 58 can be formed outside the dot region. The protrusion 58 has a height almost equal to the heights of the protrusions 28 (in the drawing, the heights of the protrusions look different from each other for clarity) and is a cone or a polypyramid having a tilted surface. In this case, the protrusion 58 regulates the directions in which the liquid crystal molecules LC fall and, in particular, is provided in the region (the reflective display region R) where the insulating film 26 is formed so as to be used as means for regulating the distance between the substrates, that is, the cell gap.

On the other hand, in the common electrode 9 formed on the internal surface side of the lower substrate 10, the slits 91 obtained by partially cutting the common electrode 9 are formed. By providing the slits 91, a distorted electric field can be generated between the respective electrodes 9 and 31 in the region where the slits are formed. The directions in which the liquid crystal molecules vertically aligned in an initial state fall when a voltage is applied are regulated by the distorted electric field. As illustrated in FIG. 3(a), the slits 91 in the form of lines, which are formed in the common electrode 9, alternate with the protrusions 28 formed in the pixel electrode 31 in plan view. As a result, it is possible to alternately regulate the directions in which the liquid crystal molecules LC fall between the slits 91 and the protrusions 28.

According to the liquid crystal display device 100 having the above structure, it can be possible to obtain the following effects. First, in the liquid crystal display device 100 according to the present embodiment, since it is possible to reduce the thickness of the liquid crystal layer 50 in the reflective display region R to half of the thickness of the liquid crystal layer 50 in the transmissive display region T by forming the insulating film 26 in the reflective display region R, it is possible to make the birefringence retardation that contributes to the reflective display almost equal to the birefringence retardation that contributes to the transmissive display and to thus improve the contrast.

In general, when a voltage is applied to the liquid crystal molecules having negative dielectric anisotropy, which are aligned on a vertical alignment film on which a rubbing process is not performed, since the directions in which the liquid crystal molecules fall are not regulated, the liquid crystal molecules fall in random directions to thus cause inferior alignment. However, according to the embodiment, since the protrusions 28 are formed on the internal surface side of the pixel electrode 31 and the slits 91 are formed in the common electrode 9 so as to be positioned between the adjacent protrusions 28 among the protrusion 28 formed in the pixel electrode 31, the alignment of the liquid crystal molecules is regulated by the tilted surfaces of the protrusions 28 and/or by the distorted electric field caused by the slits 91. Therefore, the directions in which the liquid crystal molecules vertically aligned in an initial state fall when a voltage is applied are regulated. As a result, it is possible to prevent the generation of disclinations caused by the inferior alignment of the liquid crystal molecules and to thus obtain high quality display in which afterimages caused by the generation of the disclinations or spots observed in the oblique direction are rarely generated.

According to the embodiment, the protrusions 28 can be selectively provided in the transmissive display region T. Considering that it is possible to prevent the generation of disclinations and to improve the display characteristics by regulating the directions in which the liquid crystal molecules fall, the protrusions 28 are preferably formed in the reflective display region R as well as in the transmissive display region T. Since the luminosity is higher in the transmissive mode than in the reflective mode, the protrusions are preferably formed in the transmissive display region T. The above effects can be obtained by the structure in which the protrusions are formed in the reflective display region R.

Furthermore, the protrusions 28 are formed in the transmissive region T in order to regulate the alignment of the liquid crystal molecules. At the same time, the protrusion 58 is formed outside the dot region. Therefore, it is possible to regulate the directions in which the liquid crystal molecules fall around the protrusion 58. As a result, it is possible to prevent the occurrence of inferior alignment of the liquid crystal molecules at the edge of the dot region due to the inferior alignment, which is generated outside the dot region. Furthermore, since the protrusion 58 formed outside the dot region is formed in the region (the reflective display region) in which the insulating film 26 is provided, it is possible to use the protrusion 58 as means for regulating the cell gap. That is, since the thickness of the liquid crystal layer is small in the region where the insulating film 26 is formed, the protrusion 58 formed in the region can be used as the liquid crystal layer thickness-regulating means for maintaining the cell gap to have a predetermined thickness.

Therefore, in the liquid crystal display device 100 according to the embodiment, it is possible to display highly visible images with high contrast by a simple structure without additionally providing spacers, unlike in the conventional art, by preferably regulating the directions in which the liquid crystal molecules fall and by letting at least one of the means for regulating the directions in which the liquid crystal molecules fall have the function of regulating the cell gap.

Figure 4A:
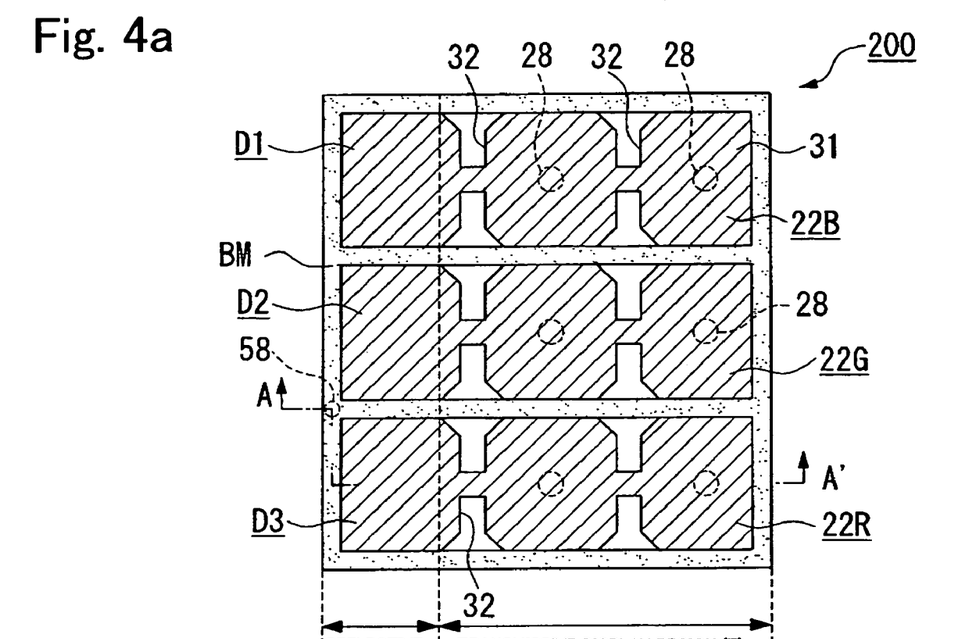
FIG. 4 is a plan schematic view and a sectional schematic view illustrating the enlarged main portion of a liquid crystal display device according to a second embodiment.
Figure 4B:
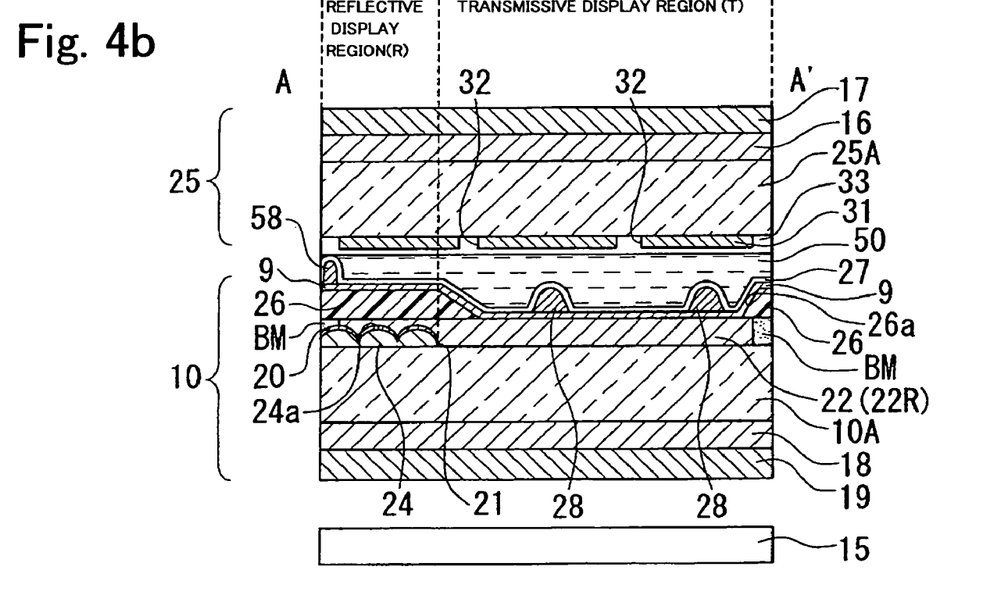

A liquid crystal display device according to a second embodiment will now be described with reference to the drawings. FIG. 4 is a schematic view illustrating the planar structure (a) and the sectional structure (b) of the liquid crystal display device 200 according to the second embodiment corresponding to FIG. 3 according to the first embodiment. The structure of the liquid crystal display device 200 according to the second embodiment is almost identical with the structure of the liquid crystal display device 100 illustrated in FIG. 3 excluding that the structures of the protrusions and the slits vary. Therefore, description of the same members denoted by the reference numerals of FIG. 3 will be omitted.

In the liquid crystal display device 200 according to the second embodiment, unlike in the liquid crystal display device 100 according to the first embodiment, the protrusions 28 are formed on the common electrode 9 of the lower substrate 10 in the transmissive display region T. On the other hand, the protrusion 58 is formed on the common electrode 9 of the lower substrate 10 outside the dot region. Also, unlike in the first embodiment, the protrusions 28 are cones or polypyramids. Like in the first embodiment, the protrusion 58 is provided in the region where the insulating film 26 is formed. On the other hand, slits 32 are formed in the pixel electrode 31 of the upper substrate 25. In this case, the slits 32 are formed so as to surround the protrusions 28 in plan view.

According to the liquid crystal display device 200 of the second embodiment, it is possible to obtain the same effects as the liquid crystal display device according to the first embodiment. In other words, the protrusions 28 formed in the transmissive display region T function as means for regulating the directions in which the liquid crystal molecules fall. On the other hand, the protrusion 58 formed on the insulating film 26 outside the dot region functions as means for regulating the directions in which the liquid crystal molecules fall and the cell gap. Therefore, since the liquid crystal display device 200 includes the protrusions 28 and the electrode slits 32 as the device for preferably regulating the directions in which the liquid crystal molecules fall, it is possible to prevent the generation of disclinations caused by inferior alignment of the liquid crystal molecules and to thus obtain high quality display in which afterimages caused by the generation of the disclinations or spots observed in the oblique direction are rarely generated. Also, it is possible to display highly visible images with high contrast by a simple structure without additionally providing the spacers by letting the protrusion 58 formed on the insulating film 26 have the function of regulating the cell gap among the means for regulating the directions in which the liquid crystal molecules fall.

Figure 5A:
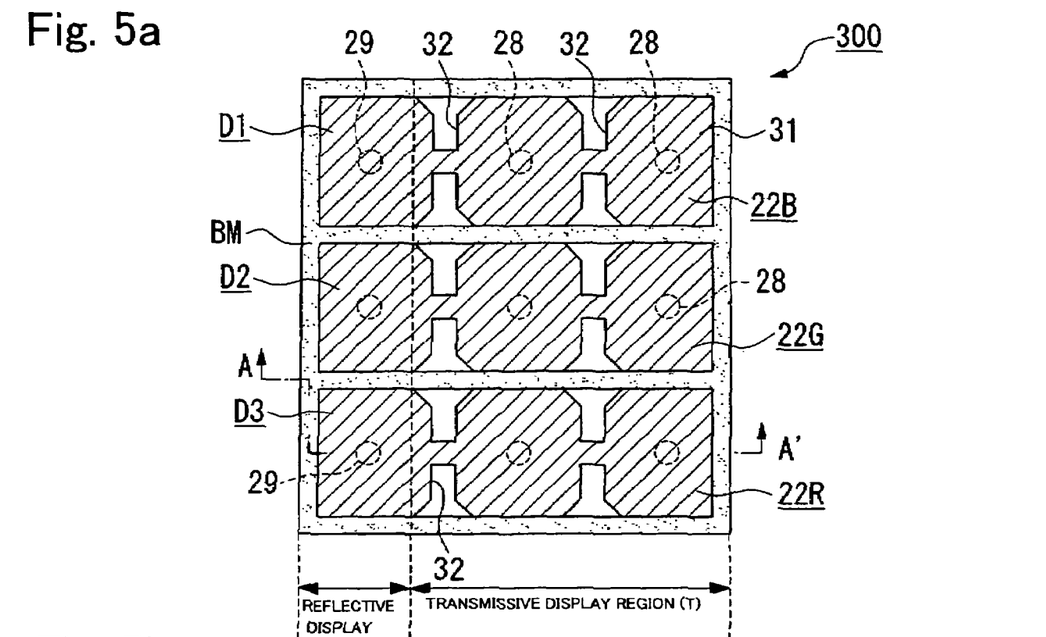
FIG. 5 is a plan schematic view and a sectional schematic view illustrating the enlarged main portion of a liquid crystal display device according to a third embodiment.
Figure 5B:
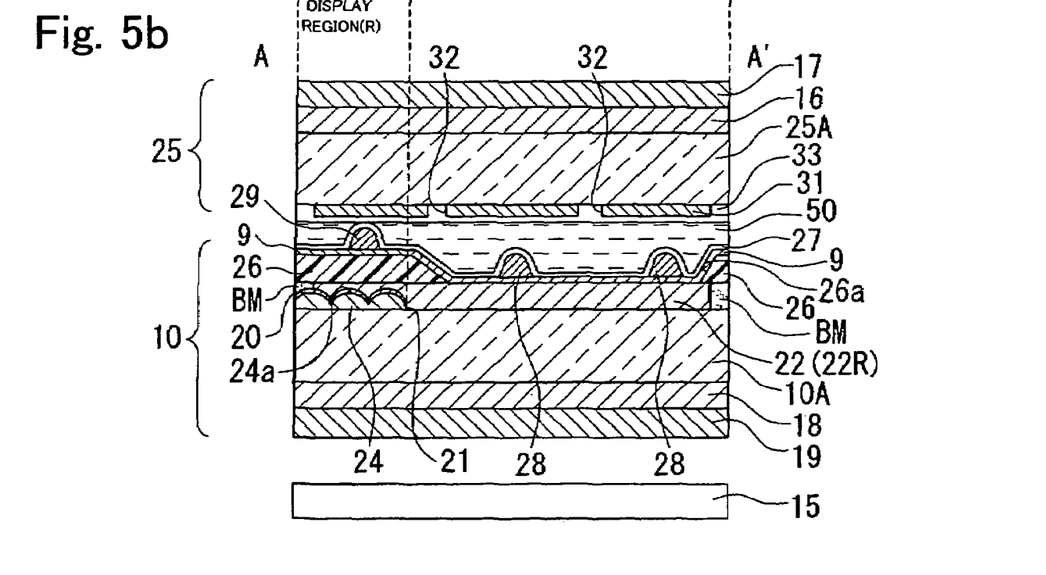

A liquid crystal display device according to a third embodiment will now be described with reference to the drawings. FIG. 5 is a schematic view illustrating the planar structure (a) and the sectional structure (b) of the liquid crystal display device 300 according to the third embodiment corresponding to FIG. 4 according to the second embodiment. The structure of the liquid crystal display device 300 according to the third embodiment is almost identical with the structure of the liquid crystal display device 200 illustrated in FIG. 4 excluding that the positions in which the protrusions are formed are different from the positions according to the second embodiment. Therefore, description of the same members denoted by the reference numerals of FIG. 4 will be omitted.

In the liquid crystal display device 300 according to the third embodiment, like in the liquid crystal display device 200 according to the second embodiment, the protrusions 28 are formed on the common electrode 9 of the lower substrate 10 in the transmissive display region T. On the other hand, unlike in the liquid crystal display device 200, no protrusions are formed outside the dot region. However, protrusions 29 are formed in the reflective display region R in the dot region. The protrusions 29 have the function of regulating the cell gap. Also, like the protrusions 28, the protrusions 29 are generally shaped as cones or polypyramids. On the other hand, the slits 32 are formed in the pixel electrode 31 of the upper substrate 25. In this case, the slits 32 are formed so as to surround the protrusions 28 and 29 in plan view.

According to the liquid crystal display device 300 of the third embodiment, it is possible to obtain the same effects as those of the first and second embodiments. That is, the protrusions 28 formed in the transmissive display region T and the protrusions 29 formed in the reflective display region R function as means for regulating the directions in which the liquid crystal molecules fall. In particular, the protrusions 29 formed on the insulating film 26 in the reflective display region R function as means for regulating the cell gap as well as the directions in which the liquid crystal molecules fall. Therefore, since the liquid crystal display device 300 includes the protrusions 28 and 29 and the electrode slits 32 as means for preferably regulating the directions in which the liquid crystal molecules fall, it is possible to prevent the generation of disclinations caused by inferior alignment of the liquid crystal molecules and to thus obtain high quality display in which afterimages caused by the generation of the disclinations or spots observed in the oblique direction are rarely generated. Also, it is possible to display highly visible images with high contrast by a simple structure without additionally providing the spacers by letting the protrusions 29 formed on the insulating film 26 in the reflective display region R have the function of regulating the cell gap among the means for regulating the directions in which the liquid crystal molecules fall.

Figure 6A:
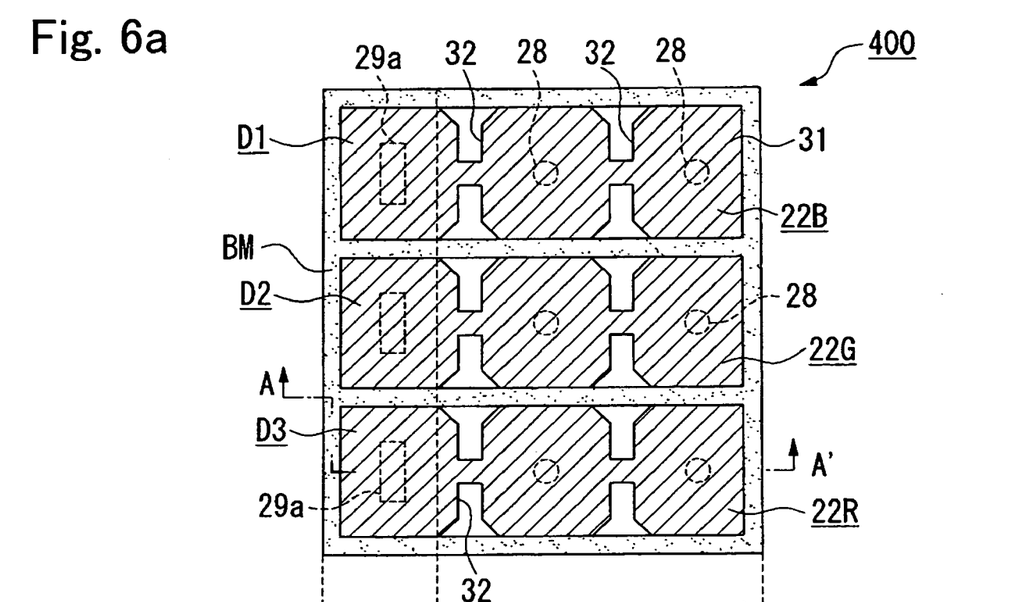
FIG. 6 is a plan schematic view and a sectional schematic view illustrating the enlarged main portion of a modification of the liquid crystal display device according to the third embodiment.
Figure 6B:
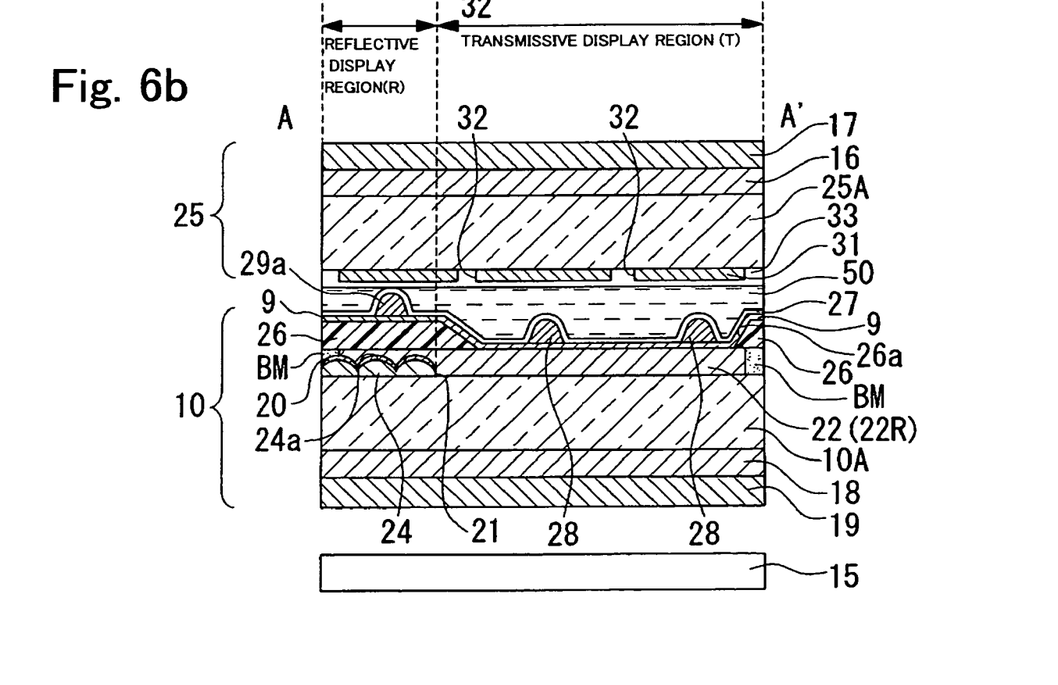

Also, the protrusions 29 formed in the reflective display region R contact the opposite substrate in order to regulate the cell gap. Therefore, an alignment regulating force of the liquid crystal molecules is weaker than that of the protrusions 28. Therefore, as illustrated in a liquid crystal display device 400 of FIG. 6, it is possible to increase the alignment regulating force of the liquid crystal molecules compared with that of the cone-shaped protrusions by forming protrusions 29a in strips in the reflective display region R in order to regulate the cell gap. In other words, in this case, since the tilt angle of the tilted surface is larger than that of the cone-shaped protrusions, it is possible to improve the alignment regulating force of the liquid crystal molecules.

Figure 7A:
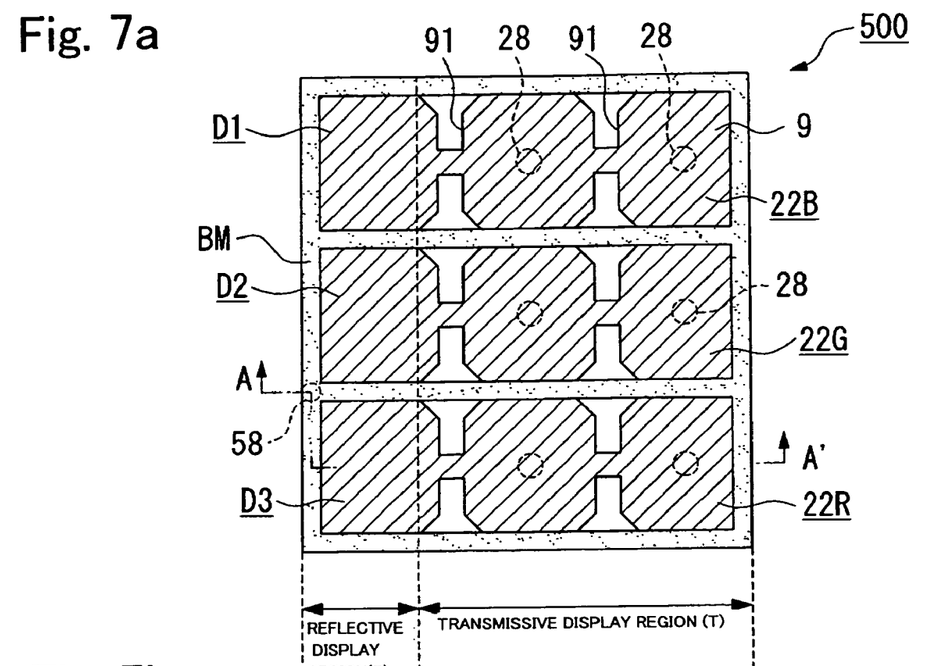
FIG. 7 is a plan schematic view and a sectional schematic view illustrating the enlarged main portion of a liquid crystal display device according to a fourth embodiment.
Figure 7B:
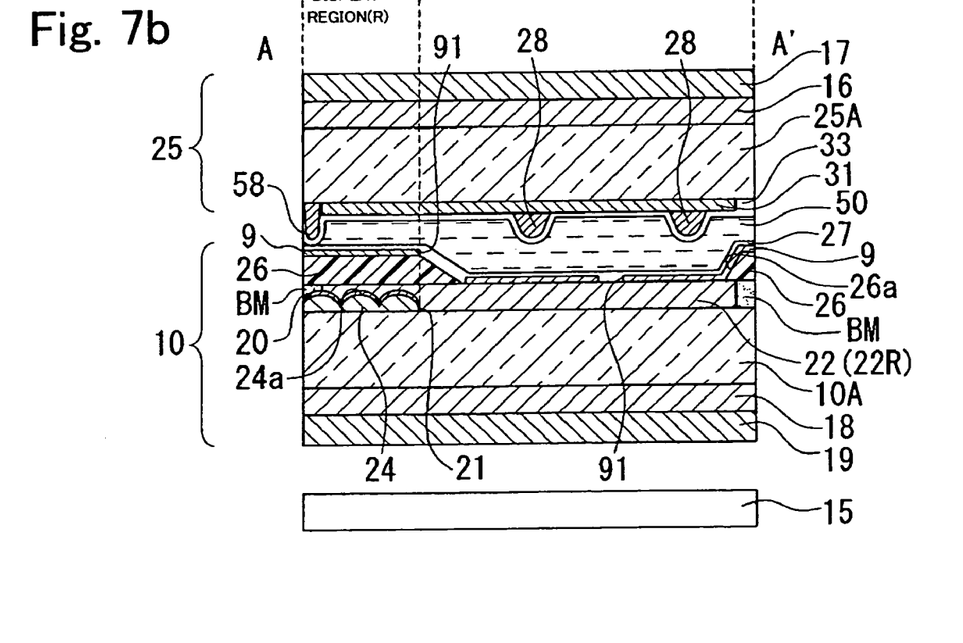

A liquid crystal display device according to a fourth embodiment will now be described with reference to the drawings. FIG. 7 is a schematic view illustrating the planar structure (a) and the sectional structure (b) of the liquid crystal display device 500 according to the fourth embodiment corresponding to FIG. 3 according to the first embodiment. The structure of the liquid crystal display device 500 according to the fourth embodiment is almost identical with the structure of the liquid crystal display device 100 illustrated in FIG. 3 excluding that the positions in which the protrusions and the slits are formed and the structures of the protrusions and the slits are different from the positions and the structure according to the first embodiment. Therefore, description of the same members denoted by the reference numerals of FIG. 3 will be omitted.

In the liquid crystal display device 500 according to the fourth embodiment, like in the liquid crystal display device 100 according to the first embodiment, the protrusions 28 are formed on the pixel electrode 31 of the upper substrate 25 in the transmissive display region T. On the other hand, the protrusion 58 is formed outside the dot region of the upper substrate 25 in the position where the insulating film 26 is formed. Like in the first embodiment, the protrusion 58 has the function of regulating the cell gap. Also, unlike in the first embodiment, the protrusions 28 are the cones or the polypyramids. On the other hand, the slits 91 are formed in the common electrode 9 of the lower substrate 10. In this case, the slits 91 are formed so as to surround the cone-shaped or polypyramid-shaped protrusions 28 in plan view.

According to the liquid crystal display device 500 of the fourth embodiment, it is possible to obtain the same effects as those of the first to third embodiments. In other words, the protrusions 28 formed in the transmissive display region T function as means for regulating the directions in which the liquid crystal molecules fall. On the other hand, the protrusion 58 provided outside the dot region in the position where the insulating film 26 is formed functions as the device for regulating the cell gap as well as the directions in which the liquid crystal molecules fall. Therefore, since the liquid crystal display device 500 includes the protrusions 28 and the electrode slits 32 as the means for preferably regulating the directions in which the liquid crystal molecules fall, it is possible to prevent the generation of disclinations caused by inferior alignment of the liquid crystal molecules and to thus obtain high quality display in which afterimages caused by the generation of the disclinations or spots observed in the oblique direction are rarely generated. Also, it is possible to display highly visible images with high contrast by a simple structure without additionally providing the spacers by letting the protrusion 58 provided outside the dot region in a position corresponding to the position in which the insulating film 26 is formed have the function of regulating the cell gap among the means for regulating the directions in which the liquid crystal molecules fall.

Figure 8A:
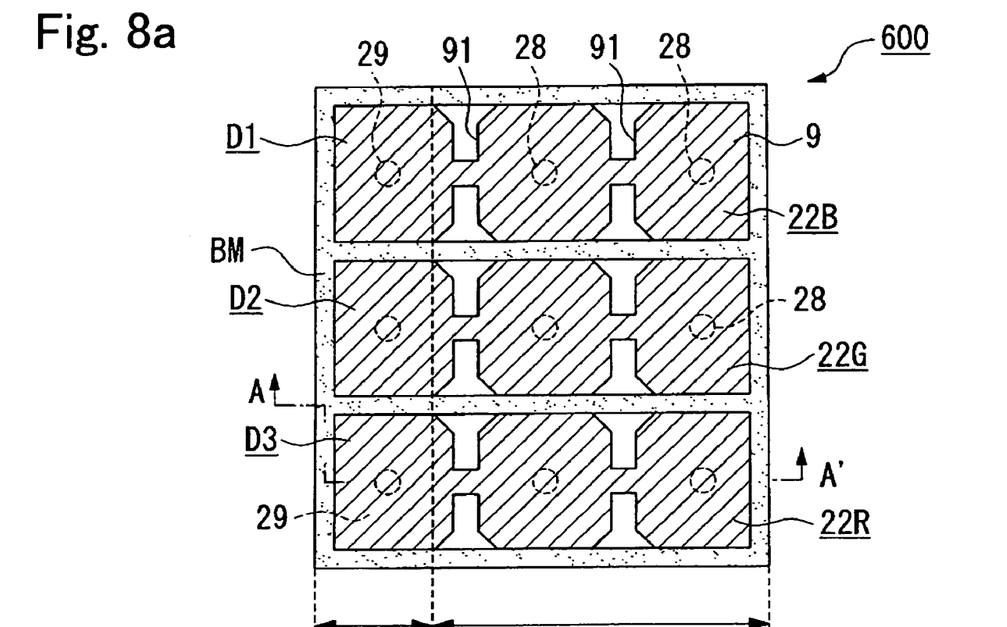
FIG. 8 is a plan schematic view and a sectional schematic view illustrating the enlarged main portion of a liquid crystal display device according to a fifth embodiment.
Figure 8B:
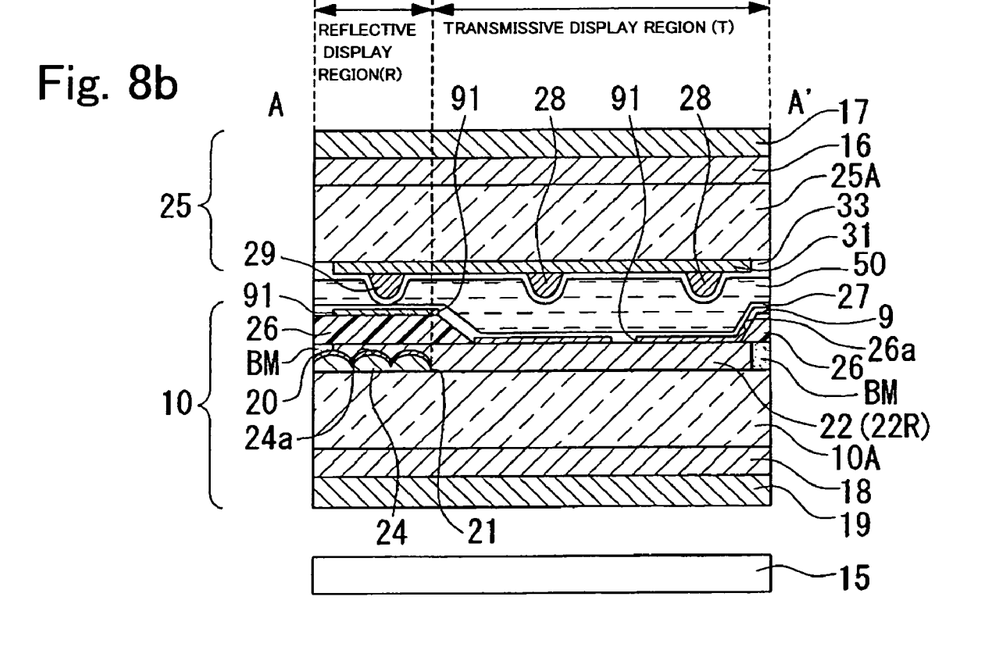

A liquid crystal display device according to a fifth embodiment will now be described with reference to the drawings. FIG. 8 is a schematic view illustrating the planar structure (a) and the sectional structure (b) of the liquid crystal display device 600 according to the fifth embodiment corresponding to corresponding to FIG. 7 according to the fourth embodiment. The structure of the liquid crystal display device 600 according to the fifth embodiment is almost identical with the structure of the liquid crystal display device 500 illustrated in FIG. 7 excluding that the positions in which the protrusions are formed are different from the positions according to the fourth embodiment. Therefore, description of the same members denoted by the reference numerals of FIG. 7 will be omitted.

In the liquid crystal display device 600 according to the fifth embodiment, like in the liquid crystal display device 500 according to the fourth embodiment, the protrusions 28 are formed on the pixel electrode 31 of the upper substrate 25 in the transmissive display region T. On the other hand, unlike in the liquid crystal display device 500, no protrusions are formed outside the dot region. However, the protrusions 29 are formed in the reflective display region R in the dot region. The protrusions 29 have the function of regulating the cell gap. Also, like the protrusions 28, the protrusions 29 are the cones or the polypyramids. On the other hand, the slits 91 are formed in the common electrode 9 of the lower substrate 10.

In this case, the slits 91 are formed so as to surround the protrusions 28 and 29 in plan view.

According to the liquid crystal display device 600 of the fifth embodiment, it is possible to obtain the same effects as those of the first to fourth embodiments. That is, the protrusions 28 formed in the transmissive display region T and the protrusions 29 formed in the reflective display region R function as a device for regulating the directions in which the liquid crystal molecules fall. In particular, the protrusions 29 provided in the position corresponding to the position in which the insulating film 26 is formed in the reflective display region R function as means for regulating the cell gap as well as the directions in which the liquid crystal molecules fall. Therefore, since the liquid crystal display device 600 includes the protrusions 28 and 29 and the electrode slits 91 as the device for preferably regulating the directions in which the liquid crystal molecules fall, it is possible to prevent the generation of disclinations caused by inferior alignment of the liquid crystal molecules and to thus obtain high quality display in which afterimages caused by the generation of the disclinations or spots observed in the oblique direction are rarely generated. Also, it is possible to display highly visible images with high contrast by a simple structure without additionally providing the spacers by letting the protrusions 29 provided in the position corresponding to the position in which the insulating film 26 is formed in the reflective display region R have the function of regulating the cell gap among the means for regulating the directions in which the liquid crystal molecules fall.

Also, the protrusions 29 formed in the reflective display region R contact the opposite substrate in order to regulate the cell gap. Therefore, the alignment regulating force of the liquid crystal molecules is weaker than that of the protrusions 28 in the transmissive display region T. Therefore, it is possible to improve the alignment regulating force of the liquid crystal molecules than that of the cone-shaped or polypyramid-shaped protrusions by forming protrusions 29a in strips in the reflective display region R. In other words, in this case, since the tilt angle of the tilted surface is larger than that of the cone-shaped protrusions, it is possible to improve the alignment regulating force of the liquid crystal molecules.

A detailed example of an electronic apparatus including the liquid crystal display device according to the embodiment of the invention will now be described.

Figure 9:
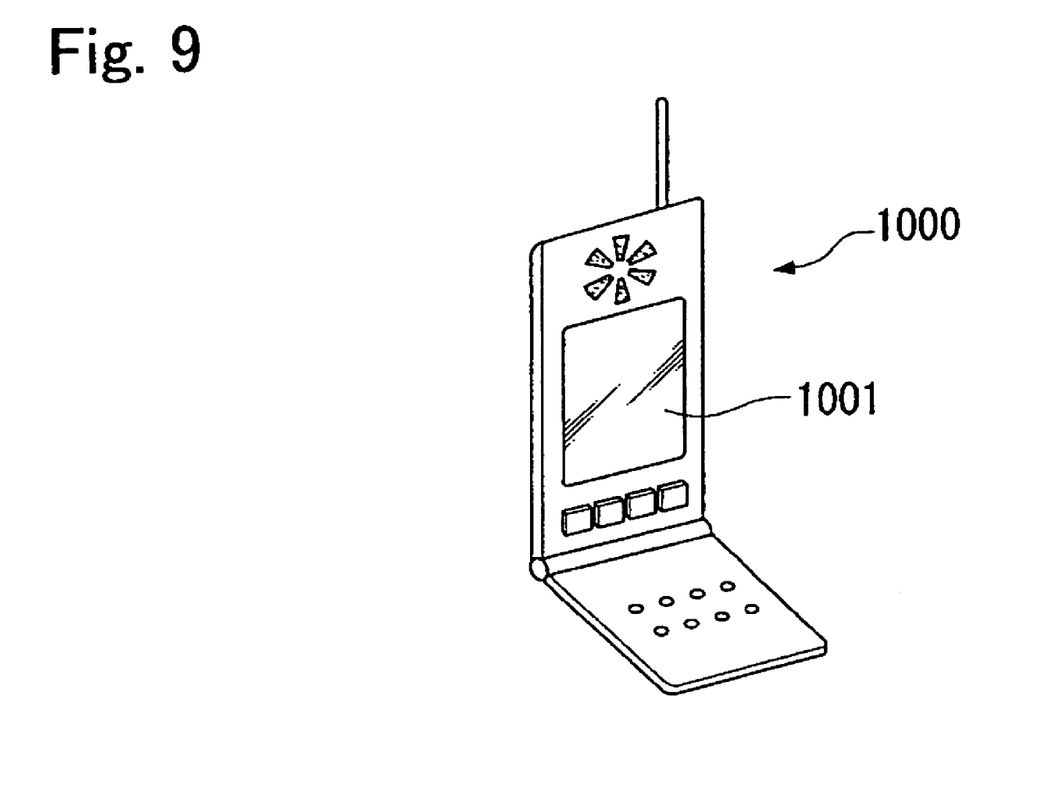
FIG. 9 is a perspective view illustrating an example of an electronic apparatus according to the present invention.

FIG. 9 is a perspective view illustrating an example of a mobile telephone. In FIG. 9, reference numerals 1000 and 1001 denote a mobile telephone main body and a display portion using the liquid crystal display device, respectively. Since such an electronic apparatus includes a display portion using the liquid crystal display device according to the present embodiment, it is possible to realize an electronic apparatus having a bright liquid crystal display portion with high contrast and a wide viewing angle, which is not dependent on use environments.

While this invention has been particularly shown and described with reference to preferred embodiments thereof, it should be understood by those skilled in the art that various changes in form and details may be made therein without departing from the spirit and scope of the invention. For example, according to the above embodiments, the retardation plate is a single plate, however, may be a stacked substance obtained by stacking a ½ wavelength plate and a ¼ wavelength plate. The stacked substance functions as a wide-band circular polarizer and can make black display achromatic. Also, the shapes of the protrusions and the electrode slits formed in the present embodiments are not limited to the structures of the above embodiments. The protrusions and the electrode slits may have any shapes suitable for regulating the directions in which the vertically aligned liquid crystal molecules fall. Also, according to the above respective embodiments, the insulating film 26 is formed in the lower substrate 10. However, the insulating film may be formed in the upper substrate 25. Furthermore, according to the above respective embodiments, the TFD is used as a switching element. However, a thin film transistor (TFT) instead of the TFD may be used as the switching element.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A liquid crystal display device, comprising:
    a first substrate having a pixel electrode;
    a second substrate having a common electrode, a slit being formed in at least one of the pixel electrode and the common electrode;
    a liquid crystal layer interposed between the first and second substrates, the liquid crystal layer including liquid crystal molecules having a negative dielectric anisotropy;
    a dot region having a transmissive display region and a reflective display region, the slit being formed between the reflective display region and the transmissive display region;
    a plurality of convex portions having dielectric material and formed on the first or second substrates,
    at least one of the plurality of convex portions being provided in the transmissive region,
    within the dot region, no convex portion is provided in the reflective display region.

2. The liquid crystal display device according to claim 1, further comprising a liquid crystal layer thickness-adjusting layer that makes a thickness of the liquid crystal layer in the reflective display region smaller than a thickness of the liquid crystal layer in the transmissive display region,
    wherein at least another of the plurality of convex portions is provided in a region where the liquid crystal layer thickness-adjusting layer is formed outside the dot region, and is in contact with the other of the first and second substrates.

3. The liquid crystal display device according to claim 1, the convex portions provided in a region where the liquid crystal layer thickness-adjusting layer is formed outside the dot region.

4. The liquid crystal display device according to claim 1, the second substrate having the plurality of convex portions.

5. The liquid crystal display device according to claim 1, the plurality of convex portions being formed on at least one of the pixel electrode and the common electrode.

6. The liquid crystal display device according to claim 5, further comprising an alignment film on the plurality of convex portions and at least one of the pixel electrode and the common electrode on which the convex portion is formed.

7. An electronic apparatus comprising the liquid crystal display device according to claim 1.

8. The liquid crystal display device according to claim 2, wherein at least one of the plurality of convex portions is formed on the liquid crystal layer thickness-adjusting layer.

* * * * *